United States Patent [19]

Komowski

[11] Patent Number: 5,645,479
[45] Date of Patent: Jul. 8, 1997

[54] AIR INLET FOR A HEATING OR AIR CONDITIONING SYSTEM

[75] Inventor: Michael Komowski, Stuttgart, Germany

[73] Assignee: Behr GmbH & Co., Stuttgart, Germany

[21] Appl. No.: 426,722

[22] Filed: Apr. 21, 1995

[30] Foreign Application Priority Data

Apr. 22, 1994 [DE] Germany ............ 44 14 036.3

[51] Int. Cl.⁶ .................................................. B60H 1/26
[52] U.S. Cl. .................................................. 454/139
[58] Field of Search .................................. 454/69, 139

[56] References Cited

U.S. PATENT DOCUMENTS

| | | | |
|---|---|---|---|
| 2,647,451 | 8/1953 | Aufiero | 454/139 X |
| 5,391,112 | 2/1995 | Wardlaw | 454/139 |

FOREIGN PATENT DOCUMENTS

| | | | |
|---|---|---|---|
| 2585636 | 6/1987 | France. | |
| 421323 | 12/1985 | Germany. | |
| 3805168 | 8/1989 | Germany. | |
| 3813116 | 10/1989 | Germany. | |
| 890396 | 9/1990 | Germany. | |
| 4214862 | 5/1993 | Germany. | |
| 4228866 | 3/1994 | Germany. | |
| 4300910 | 3/1994 | Germany. | |
| 58-206411 | 12/1983 | Japan | 454/139 |
| 1-186414 | 7/1989 | Japan | 454/139 |
| 973035 | 10/1964 | United Kingdom. | |

*Primary Examiner*—Harold Joyce
*Attorney, Agent, or Firm*—Evenson McKeown Edwards & Lenahan, PLLC

[57] ABSTRACT

An air inlet for a heating or air-conditioning system is provided which includes a movable ram air flap for controlling inlet air flow as a function of relative vehicle speed and outside air speed and a circulating-air flap for controlling relative supply of fresh and recirculating air. The ram air flap and circulating air flap are arranged coaxially with respect to one another, supported in a common bearing in an intake housing. The air flaps are nested one radially inside the other, with the ram air flap having a smaller pivoting radius.

28 Claims, 6 Drawing Sheets

AIR INLET FOR A HEATING OR AIR CONDITIONING SYSTEM

BACKGROUND AND SUMMARY OF THE INVENTION

This invention relates to an air inlet for a heating or air-conditioning system of a motor vehicle comprising a controllable ram air flap arranged in an inlet duct for outside air as well as comprising a circulating-air flap which is swivellably disposed in an intake housing of the air inlet for blocking the outside air supply.

From German Patent Document DE 42 28 866 A1, an air inlet for a heating or an air-conditioning system of a motor vehicle is known, in which a circulating-air flap for blocking the outside air supply to the interior of the motor vehicle is provided in the intake housing of the air inlet. The circulating-air flap represents a shell-shaped curved body whose wall is curved in a spherical-segment shape. The circulating-air flap is swivellably arranged in the intake housing between a position exposing the intake duct of the air inlet and a position blocking this intake duct.

In order to achieve a constant ram pressure of the fresh air in the fresh-air intake duct also at higher driving speeds of the motor vehicle, a ram air flap is additionally arranged in the case of many motor vehicles in the area of the air inlet, which ram air flap can be controlled as a function of the pressure of the fresh air flowing into the air inlet. Such an arrangement of an additional ram air flap in the air inlet is not described in German Patent Document 42 28 866 A1. For providing such an additional ram air flap, additional bearings must be provided in the housing. In order to achieve an effective control of the ram air flap, in addition, the intake duct of the air inlet between the air inlet opening and the circulating-air flap must be lengthened in comparison to intake housings without any additional ram air flap.

It is an object of the invention to provide an air inlet of the initially mentioned type which has a compact and simple construction despite the arrangement of an additional ram air flap.

This object is achieved according to preferred embodiments of the invention in that the ram air flap and the circulating-air flap are arranged coaxially with respect to one another and are integrated in a common bearing in the intake housing. As a result, despite the arrangement of an additional ram air flap, the air inlet has a compact construction and, in comparison to the known prior art, has a much shorter inlet duct for the intake of fresh air. Since a common bearing in the intake housing is provided for the ram air flap as well as for the circulating-air flap, a relatively simple construction of the air inlet is achieved. Because of the solution according to the invention, an additional bearing for the ram air flap will not be required. As a result of the fact that the ram air flap is integrated into the bearing of the circulating-air flap which exists anyhow, it becomes possible to install an additional ram air flap in a simple manner into already existing intake housings. Because of the solution according to the invention, the ram air flap requires only the space which must be available anyhow for the circulating-air flap.

In a development of the invention, the ram air flap as well as the circulating air flap are formed as shell-shaped curved bodies whose walls are symmetrical with respect to the bearing axis. In a further development, the ram air flap is arranged radially inside the circulating-air flap and the moving paths of the ram air flap and the circulating-air flap are at least partially radially superimposed. As a result, one flap can be radially moved inside the other flap, whereby the two flaps can be arranged in a closely adjoining manner.

In a further development of the invention, the ram air flap and the circulating-air flap are connected with one another in a motion-transmitting manner by means of a kinematic forced control. As a result, by means of a common control unit, on the one hand, an independent control of the ram air flap in the opened condition of the circulating-air flap is permitted and, on the other hand, the ram air flap and the circulating-air flap are, nevertheless, jointly movable when the fresh-air supply is blocked.

In a further development of the invention, in which case a lower stop edge in the area of the intake funnel is provided for the exterior flap of the two air flaps and two upper stop surfaces fixed to the housing are provided for the closed and the opened end position of the air flap, the two stop surfaces fixed to the housing are provided on two stop ribs which are symmetrically aligned with respect to a perpendicular radial plane which contains the bearing axis and are arranged at a distance from one another, and the lower stop edge is arranged at a distance from a horizontal radial plane containing the bearing axis, which distance is larger than the distance of a stop surface from the perpendicular radial plane. As a result, it becomes possible to arrange the bearing axis relative to the intake funnel and therefore also relative to the blower at a larger distance, whereby an increased overall height is obtained for the housing of the kinematic forced control unit.

In a further development of the invention, the two stop ribs are connected by means of a transverse web to form a U-shaped profile. This is a development which is appropriate for plastic and by means of which the two stop ribs which are spaced with respect to one another can be connected with one another to form a stable profile which is sealed off to the outside.

In a further development of the invention, the U-shaped profile is molded as a circular-arc-shaped curved recess into the housing wall of the intake housing. As a result, the profile with the two stop ribs is connected in one piece with the housing wall of the intake housing and can already be molded in during the manufacturing of the intake housing consisting of plastic.

In a further development of the invention, for the purpose of a reinforcement, the U-shaped profile is provided with at least one transverse reinforcement along its circular-arc-shaped course. As a result, the U-shaped profile is reinforced along the circumference of the intake housing and therefore contributes to the reinforcement of the whole intake housing.

Other objects, advantages and novel features of the present invention will become apparent from the following detailed description of the invention when considered in conjunction with the accompanying drawings.

DETAILED DESCRIPTION OF THE DRAWINGS

Figure 1:
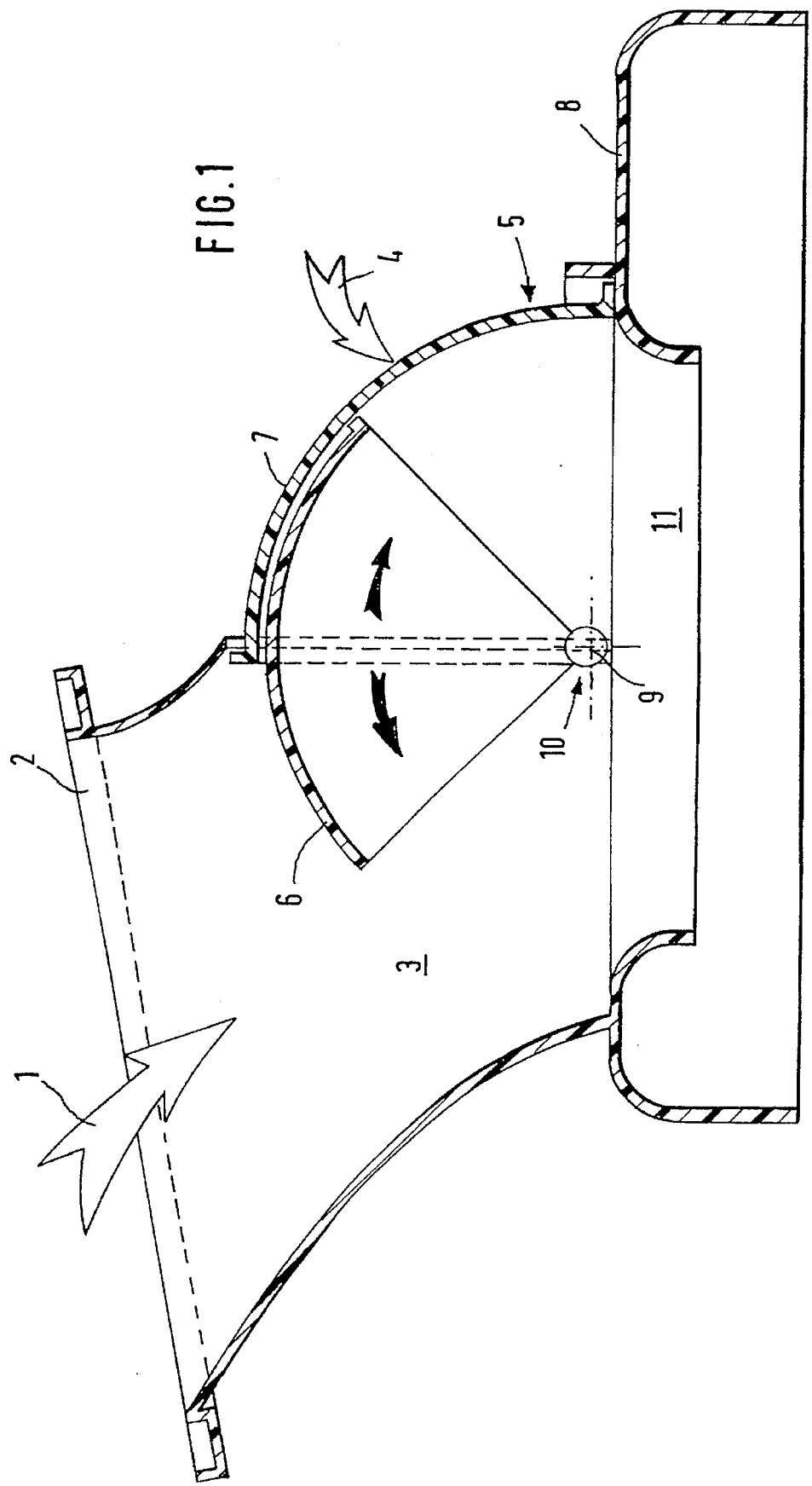
FIG. 1 is a sectional schematic view of an embodiment of an air inlet arrangement according to the invention in which the intake housing is provided with a ram air flap as well as with a circulating-air flap.
Figure 2:
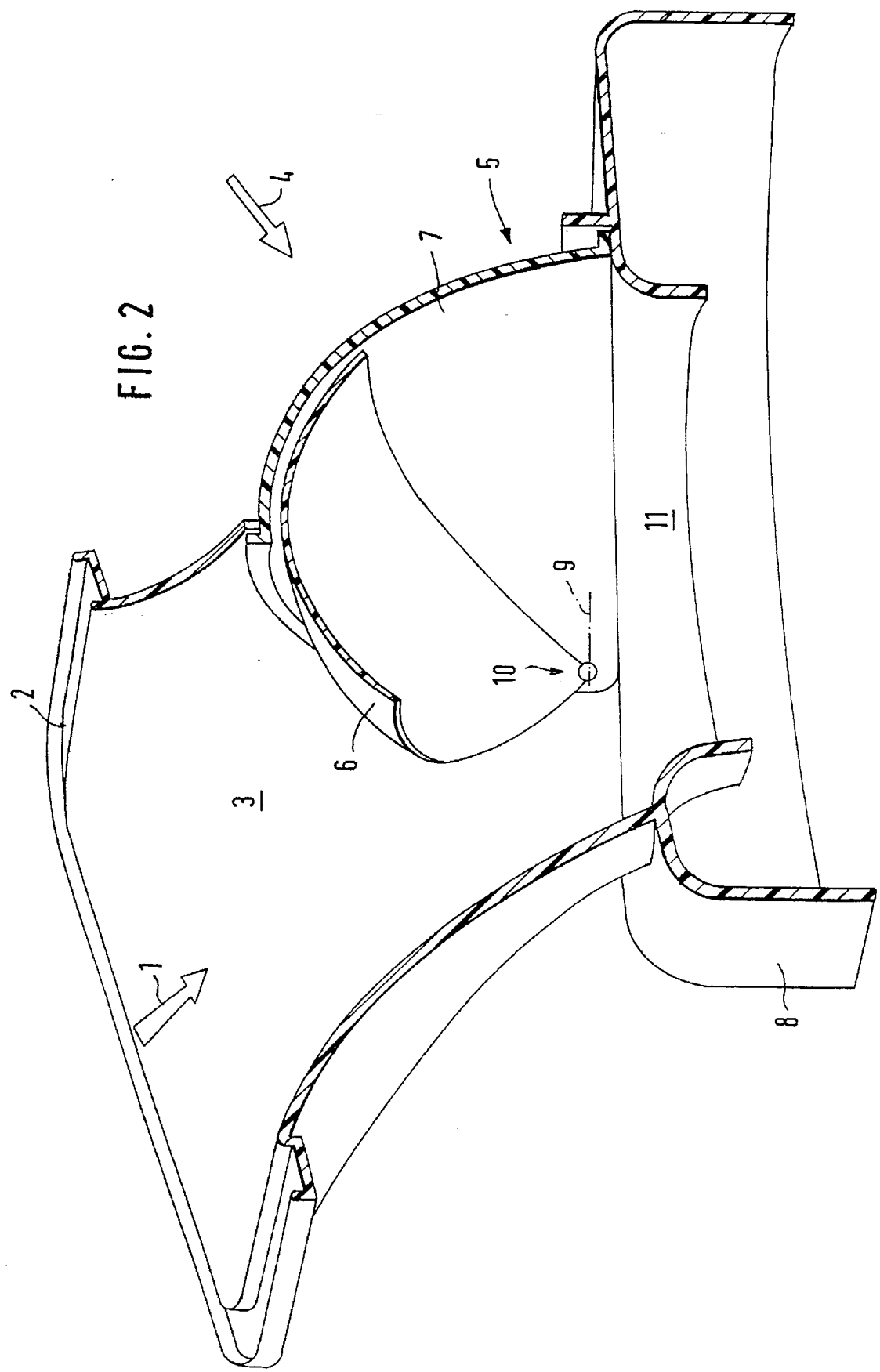
FIG. 2 is schematic a perspective cut-open view of the air inlet arrangement according to FIG. 1.

An air inlet arrangement according to FIGS. 1 and 2 has an intake housing 3, 8 which is made of plastic. The air inlet arrangement according to FIG. 1 and 2 is provided for the arrangement in an engine compartment of a motor vehicle— in the driving direction in front of the passenger compartment. When installed in the motor vehicle, an open inlet piece 2 points diagonally upward and is used for receiving fresh outside air 1. The inlet piece 2 changes into a housing part 8 which is provided with an intake funnel 11 to an outlet duct which is not shown in detail and leads to a corresponding blower for a heating or air-conditioning system. The fresh outside air 1 supplied through an inlet duct 3 in the inlet piece 2 is therefore guided through the intake funnel 11 into the outlet duct. The inlet duct 3 in the inlet piece 2 can be blocked by a circulating-air flap which has the hollow shape of a quarter sphere and is therefore also called a spherical flap.

The circulating-air flap 7 is disposed to be swivellable about a bearing axis 9 which represents the axis of symmetry of the quarter sphere and is arranged in the center and horizontally directly above the intake funnel 11. Laterally next to the inlet piece 2 and the inlet duct 3, a circulating-air opening 5 for a circulating-air duct is provided in the intake housing 2, 8, which circulating-air duct also leads into the intake funnel 11. Through the circulating-air duct, circulating air 4 can be supplied to the intake funnel 11 which is circulated in the interior of the motor vehicle.

In the illustrated position according to FIGS. 1 and 2, the spherical-shell-shaped circulating-air flap 7 completely closes the circulating-air opening 5. In this position, fresh outside air 1 therefore reaches the interior of the motor vehicle through the intake funnel 11 and a corresponding heating or air-conditioning system. By means of a switching device, the circulating-air flap 7 can be swivelled into a position which blocks the inlet duct 3 and in which no more fresh outside air 1 can be supplied to the intake funnel 11. In the shown FIGS. 1 and 2, this takes place by means of a swivelling by 90° counterclockwise about the bearing axis 9. The air inlet according to FIGS. 1 and 2 described so far, together with its circulating-air flap control, corresponds to the air inlet which is known from German Patent Document DE 42 28 866 A1.

In order to achieve a constant ram pressure and therefore constant flow conditions irrespective of the velocity of the outside air 1 at the opening of the inlet piece 2 in the area of the intake funnel 11 of the intake housing 2, 8, the air inlet has a controllable ram air flap 6. The different flow velocities of the outside air 1 are the result of different driving speeds or strong wind currents to which the motor vehicle is exposed. In its shape, the ram air flap 6 corresponds to the circulating-air flap 7 so that the ram air flap also has the shell-shaped hollow design of a quarter sphere. The radius of the quarter sphere of the ram air flap 6, however, is slightly smaller than that of the circulating-air flap 7. The ram air flap 6 is arranged to be swivellable coaxially to the circulating-air flap 7 about the bearing axis 9, in which case it is integrated into the bearings 10 of the circulating-air flap 7 in the opposite walls of the intake housing 2, 8. In the embodiment shown, the bearing of the ram air flap 6 in the bearings 10 of the circulating-air flap 7 takes place in a simple manner by means of two bearing journals which project coaxially to the outside from the axis of symmetry of the ram air flap 6 and can be inserted into corresponding bearing bushes in the bearings 10 of the circulat- ing-air flap 7.

In order to be able to swivel the ram air flap 6, the latter is rigidly arranged on a bearing shaft which is coaxial to the bearing axis 9 and projects out of the intake housing 2, 8 to the outside. A control lever 17, which projects radially to the bearing axis 9 from the bearing shaft, is non-rotatably connected with the bearing shaft and therefore also with the ram air flap 6. On its free end, the control lever 17 has a control pin 16 which will be described in detail in the following and which engages in a connecting link guide 14 of a plate cam 12 which will also be described in detail in the following. A hollow shaft, which is coaxial with respect to the bearing axis and encloses the bearing shaft of the ram air flap 6 and which also projects out of the intake housing 2, 8 to the outside, is rigidly connected with the circulating-air flap 7.

Figure 3:
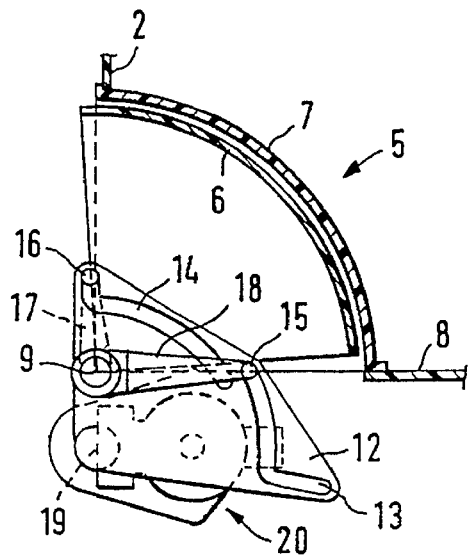
FIG. 3 is a view of the forced control for the ram air flap and the circulating-air flap, in which the circulating-air flap is in the closed position and the ram air flap is in the closed position.
Figure 4:
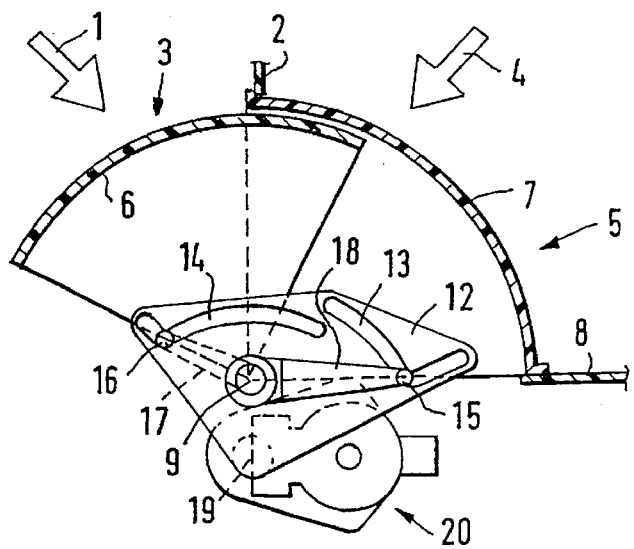
FIG. 4 is a view of the force control for the ram air flap and the circulating-air flap according to FIG. 3, in which the air flap is in the closed position and the ram air flap is in its partial opened ram position.

Analogously to the control lever 17, a control lever 18 is non-rotatably connected with the hollow shaft and also projects from the hollow shaft radially to the bearing axis 9. Control lever 18 is slightly longer than control lever 17 and also has a control pin 15 which engages into another connecting link guide 13 of the plate cam 12. Control pin 15 is at a larger radial distance from the bearing axis 9 than control pin 16. The plate cam 12 is disposed to be swivellable about an axis 19 which is arranged in parallel to the bearing axis 9 at a distance below it. The plate cam 12 is non-rotatably connected with a drive shaft which is coaxial to the axis 19 and which is driven by a drive unit 20. By means of the plate cam 12, the drive unit 20, on the one hand, controls the swivelling of the ram air flap 6 independently of the circulating-air flap 7 and, on the other hand, carries out the change-over of the circulating-air flap 7 between the end position blocking the outside air and the end position exposing the inlet duct 3. The connecting link guide 14 for the ram air flap 6 and the connecting link guide 13 for the circulating-air flap 7 are designed such that, on the one hand, in the opened position of the circulating-air flap 7 according to FIGS. 3 and 4, a control of the ram air flap 6, which is independent of the circulating-air flap 7, is permitted by means of the plate cam 12 and the drive unit 20. The open end position of the ram air flap 6 is illustrated in FIG. 3; the closed end position of the ram air flap 6 is illustrated in FIG. 4. In the completely opened position of the ram air flap 6 according to FIG. 3, the control pin 15 of the circulating-air flap 7 is situated on the left outer end of the connecting link guide 13. In the closed position of the ram air flap 6 according to FIG. 4, the control pin 15 of the circulating-air flap 7 is situated on the right end of the circular-segment-shaped curved section of the connecting link guide 13. This curved section is concentric with respect to the axis 19 of the plate cam 12 so that a swivelling of the plate cam 12 is possible without moving the circulating-air flap 7. In contrast, the control pin 16 of the ram air flap 6 is situated in a lengthening of the connecting link guide 14 which projects to the outside approximately radially with respect to the axis 19, in which connecting link guide 14 the ram air flap 6 is taken along during a swivel movement of the plate cam 12.

Figure 5:
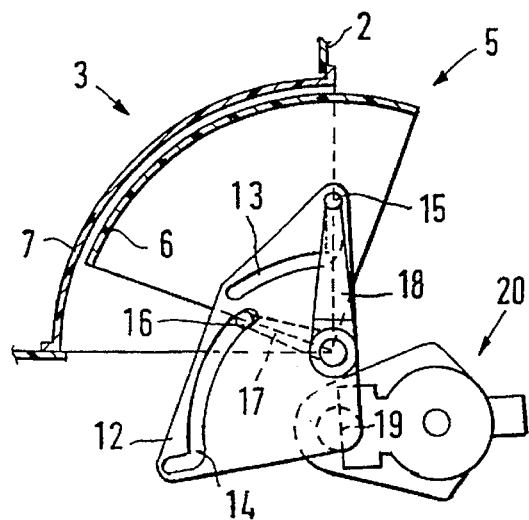
FIG. 5 is a view of the arrangement according to FIGS. 3 and 4 in which the circulating-air flap is opened, in which, and the ram air flap is in the closed position.

However, as soon as the plate cam 12 swivels from the position illustrated in FIG. 4 farther counterclockwise to the left, the control lever 18 is taken along by way of the control pin 15 and therefore also the circulating-air flap 7 and, during another swivel movement of the plate cam 12, swivels into the blocked end position in which the inlet duct 3 is completely blocked and only circulating-air 4 is circulated in the interior of the motor vehicle. Since the circular-segment-shaped curved section which adjoins the radial lengthening of the connecting link guide 14 is curved concentrically with respect to the axis 19, the ram air flap 6 carries out no additional swivel movement between the position illustrated in FIG. 4 and the position illustrated in FIG. 5. In the case of a corresponding reverse swivelling of the plate cam 12, the circulating-air flap 7 is first swivelled from its closed position according to FIG. 5 back into the open position according to FIG. 4 before, by means of the plate cam 12, an independent control of the ram air flap 6 becomes possible. The kinematic forced control for the circulating-air flap 7 and the ram air flap 6 which is designed in this manner is expedient because the ram air flap 6 does not have to become operative anyhow as long as the fresh outside air 1 is blocked.

In the case of an embodiment of the invention which is not shown, two separate drives are provided for the ram air flap and the circulating-air flap. The drive for the ram air flap controls the swivel position of the ram air flap as a function of the momentary pressure and flow conditions. The drive for the circulating-air flap for the change-over between an open position and a position blocking the outside air is controlled either by the pressing of a button from the vehicle interior or automatically by a control inside the heating or air-conditioning system connected with a pollutant sensor.

In the illustrated embodiment, one spherical flap respectively is used as the ram air flap 7 and as the circulating-air flap 7. However, in the same manner, the invention contemplates using different flap shapes in other embodiments which are also arranged coaxially with respect to one another and are integrated in a common bearing. Depending on the shape and the construction of these flaps, naturally, the inlet and outlet ducts as well as the circulating air guide are also developed to be coordinated correspondingly.

Figure 6:
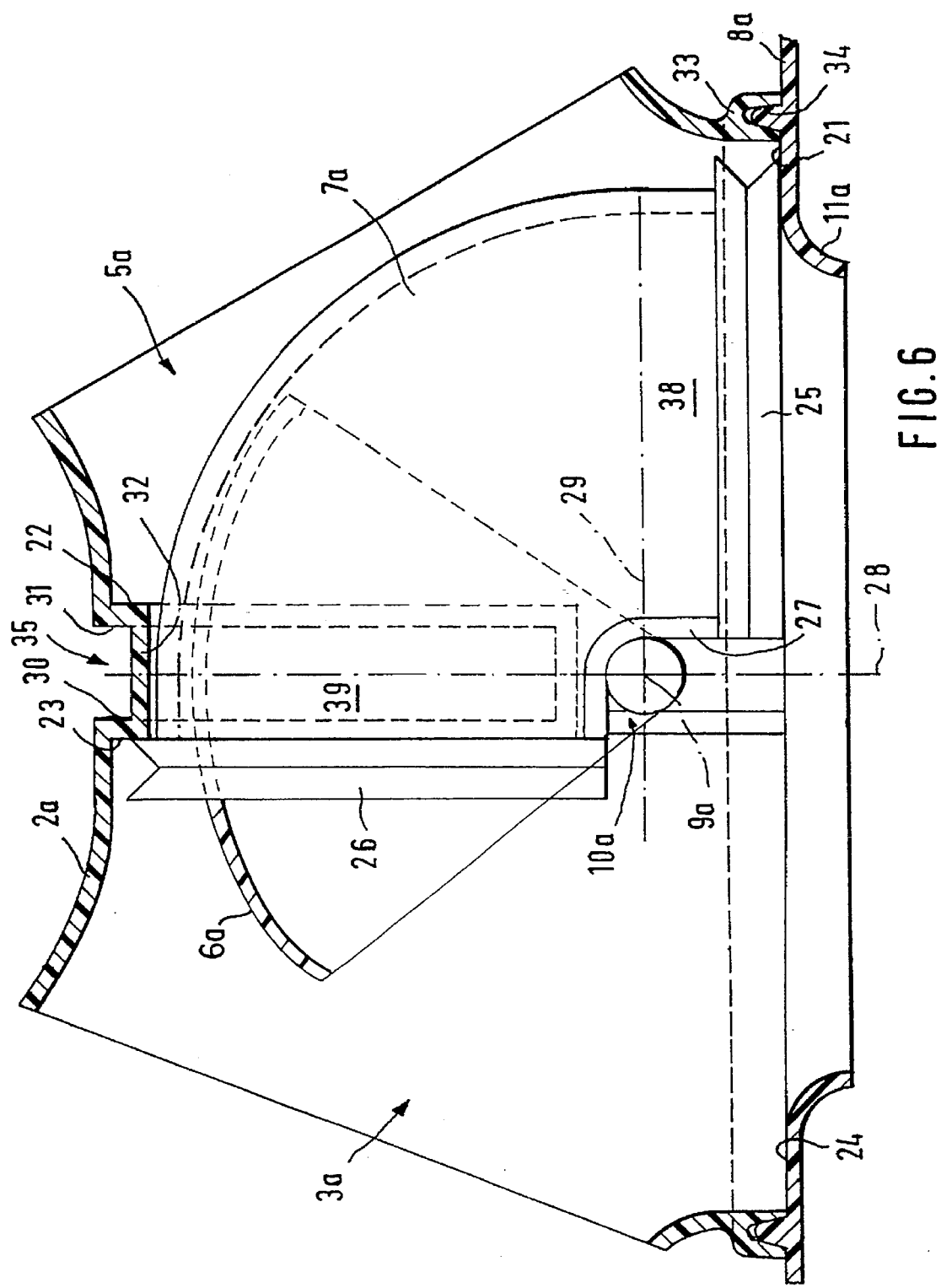
FIG. 6 is a sectional view of another embodiment of an air inlet arrangement according to the invention which is provided with an enlarged circulating-air flap.
Figure 7:
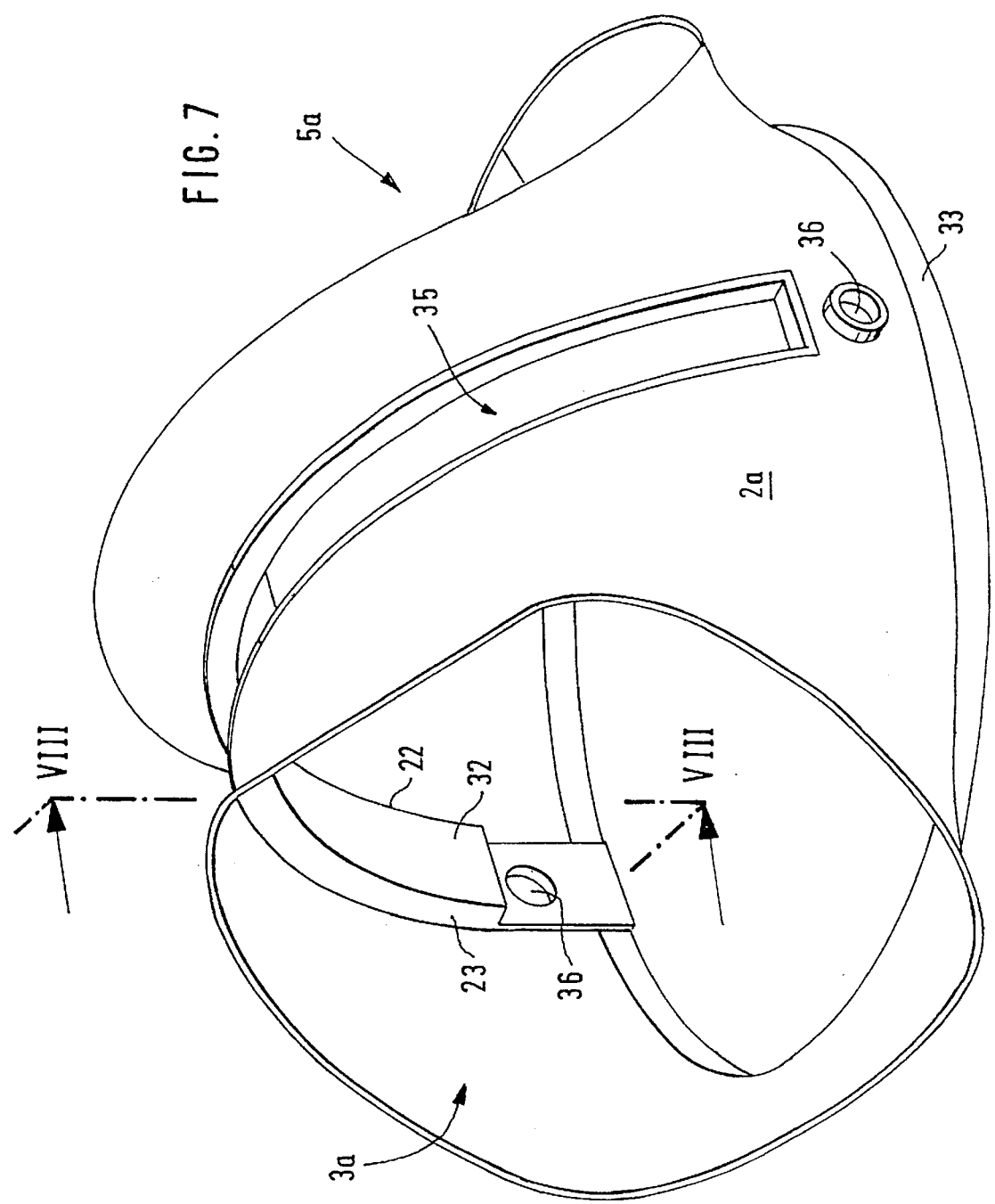
FIG. 7 is a perspective representation of an intake housing of the air inlet arrangement according to FIG. 6.
Figure 8:
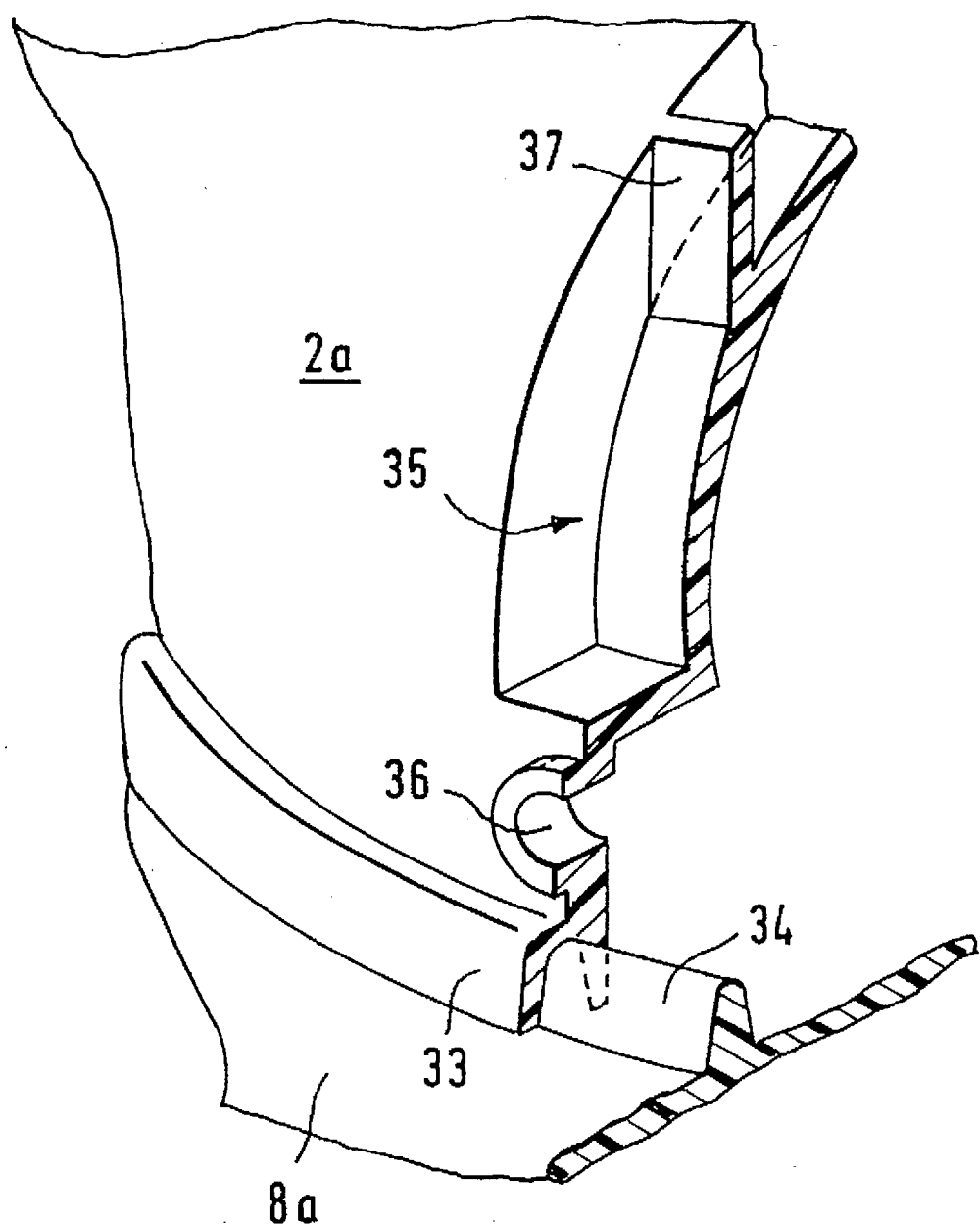
FIG. 8 is a perspective representation of a cut-out of the intake housing according to FIG. 7 along the sectional plane VIII—VIII in FIG. 7.

In the case of the embodiment according to FIGS. 6 to 8, an intake housing 2a, 8a is provided which is made of two parts of a plastic material. The intake housing 2a, 8a is divided into an intake part 2a and a funnel part 8a, in which case the intake part 2a is placed in a form-locking and force-locking manner by means of a groove-shaped edge 33 on a projection 34 of the funnel part 8a which projects upwards in the manner of a web. The intake part 2a has an inlet duct 3a for fresh air and a circulating-air opening 5a for a circulating-air duct. With respect to its important operating elements, the intake housing 2a, 8a corresponds to the intake housing 2, 8 according to FIGS. 1 and 2, in which case elements which have the same function are provided with the same reference numbers with the addition of a letter "a".

In the intake part 2a, a circulating-air flap 7a is disposed on a bearing shaft 10a so that it can be swivelled about a bearing axis 9a. In the illustrated embodiment, the bearing axis 9a extends horizontally and perpendicularly to the plane of projection according to FIG. 6. A ram air flap 6a is arranged in the circulating-air flap 7a so that it can be swivelled coaxially about the bearing axis 9a, the arrangement and the control of the ram air flap and of the circulating-air flap 7a corresponding to the above-described embodiment according to FIGS. 1 to 5 so that, for a further explanation, reference is made to the description concerning FIGS. 1 to 5.

In the case of the embodiment according to FIGS. 6 to 8, the intake funnel 11a and therefore also the funnel part 8a is offset at a distance in the downward direction with respect to the bearing axis 9a so that an increased overall height is obtained for the control elements of the two air flaps. As a result, a blower, which adjoins the intake funnel 11a, is also arranged at a larger distance below the bearing axis 9a than in the embodiment according to FIGS. 1 to 5. In order to nevertheless permit a tight blocking of the circulating-air flap 5a or of the inlet duct 3a, the circulating-air flap 7a will no longer—as in the embodiment according to FIGS. 1 to 5—have the shape of a quarter spherical shell, but is provided on its two faces with lengthenings 38, 39 extended to the outside.

These lengthenings 28, 39 lengthen frontal edges of the quarter spherical shape of the circulating-air flap 7a to the level of the mutually perpendicular radial planes 28, 29 in a straight line to the outside, as indicated in FIG. 6. These lengthenings 38, 39 are adjoined by sealing lips 25, 26 whose radial height relative to the bearing axis 9a is larger than that of the lengthenings 38, 39 and that of the circulating-air flap 7a. In the illustrated embodiment, the circulating-air flap 7a is in its end position which closes off the circulating-air opening 5a. In this end position, the sealing lip 25 rests in parallel to the horizontal radial plane 29 on a stop edge 21 of the funnel part 8a which is adjoined in the downward direction by the intake funnel 11a. At the same time, the other sealing lip 26, which is aligned in parallel to the perpendicular radial plane 28, rests against a stop surface 23 of a stop rib 30 which is arranged to be offset at a distance to the perpendicular radial plane 28 in the direction of the inlet duct 3a. The laterally offset stop rib 30 is part of the intake housing 2a and projects from the housing wall perpendicularly and in parallel with respect to the radial plane 28 toward the inside. Naturally, the circular-arc-shaped curved stop rib 30 extends into the housing interior only so far that it does not hinder the swivel movement of the circulating-air flap 7a. Another stop rib 31, which penetrates into the housing interior in parallel to stop rib 30, is provided at the same distance to the radial plane 28 symmetrically with respect to the stop rib 30 on the side opposite the radial plane 28. By means of this stop rib 31, another stop surface 22 is formed which is opposite the stop surface 23. The two stop surfaces 22, 23 each have the same distance to the radial plane 28. This distance corresponds precisely to the height of the lengthening 39 of the circulating-air flap 7a and therefore also to the height of the lengthening 38. The distance of the stop edge 21 of the funnel part 8a to the horizontal radial plane 29 is therefore by the thickness of the sealing lip 25 larger than the distance of the stop surface 22, 23 to the perpendicular radial plane 28. Since both radial planes 28, 29 contain the bearing axes 9a, the distance of the bearing axis 9a to the stop edge 21 is also as large as the distance of the radial plane 29 to the stop edge 21. In its opposite end position, which completely exposes the circulating-air opening 5a, sealing lip 25 rests on the stop surface 22 and sealing lip 26 rests on the stop edge 24 of the funnel part 8a, the stop edge 24 being situated in the same plane as the stop edge 21.

In order to connect the two stop ribs 30, 31 with one another and, at the same time, close off the intake housing toward the outside, the faces of the two stop ribs 30, 31 are connected with one another by a surrounding transverse web 32 which extends in a circular-arc-shape. As a result, the two stop ribs 30, 31 as well as the transverse web 32 form a U-shaped profile which is molded in one piece into the housing wall and thus, toward the outside, results in a channel-type groove The design of the channel-type groove 35 is illustrated in FIG. 7.

For the support of the bearing shaft 10a, two bearing bushes 36 are provided in the opposite housing walls below the channel-type groove 35. The channel-type groove 35 ends on both sides of the intake part 2a of the intake housing 2a, 8a at a distance above the bearing bushes 36. In order to achieve a sealing-off of the circulating-air flap 7a relative to the housing wall also in the area of the two bearing bushes 36, the two sealing lips 26 are provided on both sides of the circulating-air flap 7a with one tulip-shaped seal 27 respectively which projects away from the exterior wall of the circulating-air flap 7a—relative to the bearing axis 9a—in each case axially to the outside to the housing wall. In order to reinforce the channel-type groove 35, that is, the U-shaped profile in the housing wall, several web-shaped transverse reinforcements 37 (FIG. 8) are provided along the circular-arc-shaped course of the channel-type groove 35.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Air inlet arrangement for a heating or air-conditioning system of a motor vehicle comprising:
   a circulating air inlet,
   an outside air inlet,
   a controllable circulating air flap disposed to control the circulating air inlet opening, and
   a controllable ram air flap disposed to control the circulating air inlet opening, said ram air flap being controllably movable independently of the circulating air flap to thereby control ram air pressure of air flowing through said outside air inlet independently of the position of the circulating air flap,
   wherein the circulating air flap and ram air flap are supported for pivotal movement about a common bearing axis.

2. Air inlet arrangement according to claim 1, comprising an air intake housing defining the outside air inlet and providing a bearing support for the pivotal movement of said circulating air flap and ram air flap about said common bearing axis.

3. Air inlet arrangement according to claim 2, wherein the ram air flap and the circulating-air flap are both constructed as hollow bodies curved in a shell shape whose walls are symmetrical with respect to the bearing axis.

4. Air inlet arrangement according to claim 1, wherein the ram air flap and the circulating-air flap are both constructed as hollow bodies curved in a shell shape whose walls are symmetrical with respect to the bearing axis.

5. Air inlet arrangement according to claim 4, wherein the ram air flap is arranged radially inside the circulating-air flap, and wherein moving paths of the ram air flap and the circulating-air flap are at least partially coaxially superimposed.

6. Air inlet arrangement according to claim 4, wherein the ram air flap and the circulating-air flap are designed corresponding to the hollow shape of a quarter sphere.

7. Air inlet arrangement according to claim 5, wherein the ram air flap and the circulating-air flap are designed corresponding to the hollow shape of a quarter sphere.

8. Air inlet according to claim 1, wherein the ram air flap and the circulating-air flap are connected with one another in a motion-transmitting manner by a kinematic forced control unit.

9. Air inlet arrangement according to claim 8, wherein the kinematic forced control unit comprises a plate cam provided with two separate curved paths for the ram air flap and the circulat- ing-air flap, which plate cam can be swivelled by means of an actuating drive.

10. Air inlet arrangement according to claim 9, wherein the curved paths for the movement of the ram air flap and of the circulating-air flap are superimposed such that, in an opened position of the circulating-air flap, the ram air flap can be moved independently of the circulating-air flap, and wherein in a closed position of the circulating-air flap, the ram air flap is in its ram position.

11. Air inlet arrangement according to claim 4, wherein the ram air flap and the circulating-air flap are connected with one another in a motion-transmitting manner by a kinematic forced control unit.

12. Air inlet arrangement according to claim 11, wherein the kinematic forced control unit comprises a plate cam provided with two separate curved paths for the ram air flap and the circulating-air flap, which plate cam can be swivelled by means of an actuating drive.

13. Air inlet arrangement according to claim 12, wherein the curved paths for the movement of the ram air flap and of the circulating-air flap are superimposed such that, in an opened position of the circulating-air flap, the ram air flap can be moved independently of the circulating-air flap, and wherein in a closed position of the circulating-air flap, the ram air flap is in its ram position.

14. Air inlet arrangement according to claim 5, wherein the ram air flap and the circulating-air flap are connected with one another in a motion-transmitting manner by a kinematic forced control unit.

15. Air inlet arrangement according to claim 14, wherein the kinematic forced control unit comprises a plate cam provided with two separate curved paths for the ram air flap and the circulating-air flap, which plate cam can be swivelled by means of an actuating drive.

16. Air inlet arrangement according to claim 15, wherein the curved paths for the movement of the ram air flap and of the circulating-air flap are superimposed such that, in an opened position of the circulating-air flap, the ram air flap can be moved independently of the circulating-air flap, and wherein in a closed position of the circulating-air flap, the ram air flap is in its ram position.

17. Air inlet according to claim 2, comprising a lower stop edge in an area of an air intake funnel as well as two upper stop surfaces which are fixed to the housing for the closed and the opened end positions of the air flap, wherein the two stop surfaces fixed to the housing are provided on two stop ribs aligned symmetrically to a perpendicular radial plane containing a bearing axis of the common bearing, which stop ribs are arranged at a distance from one another, and wherein the lower stop edge is arranged at a distance to a horizontal radial plane which contains the bearing axis, which distance is larger than the distance of a stop surface to the perpendicular radial plane.

18. Air inlet arrangement according to claim 17, wherein the two stop ribs are connected with one another by means of a transverse web to form a U-shaped profile.

19. Air inlet arrangement according to claim 18, wherein the U-shaped profile is molded as a circular-arc-shaped curved recess into the housing wall of the intake housing.

20. Air inlet arrangement according to claim 19, wherein the U-shaped profile is provided with at least one transverse reinforcement for the reinforcement along its circular-arc-shaped course.

21. Air inlet arrangement according to claim 17, wherein the ram air flap and the circulating-air flap are designed corresponding to the hollow shape of a quarter sphere.

22. Air inlet arrangement according to claim 21, wherein the ram air flap is arranged radially inside the circulating-air flap, and wherein moving paths of the ram air flap and the circulating-air flap are at least partially coaxially superimposed.

23. Air inlet arrangement for a heating or air-conditioning system of a motor vehicle comprising:

an intake housing, a controllable ram air flap arranged in an outside air inlet duct of the intake housing, and a circulating-air flap which is pivotally disposed in the intake housing for selectively blocking the outside air supply, wherein the ram air flap and the circulating-air flap are arranged coaxially with respect to one another and are integrated in a common bearing in the intake housing, wherein the ram air flap and the circulating-air flap are connected with one another in a motion-transmitting manner by a kinematic forced control unit, and wherein the kinematic forced control unit comprises a plate cam provided with two separate curved paths for the ram air flap and the circulating-air flap, which plate cam can be swivelled by means of an actuating drive.

24. Air inlet arrangement for a heating or air-conditioning system of a motor vehicle comprising:

an intake housing, a controllable ram air flap arranged in an outside air inlet duct of the intake housing, and a circulating-air flap which is pivotally disposed in the intake housing for selectively blocking the outside air supply, wherein the ram air flap and the circulating-air flap are arranged coaxially with respect to one another and are integrated in a common bearing in the intake housing, wherein the ram air flap and the circulating-air flap are both constructed as hollow bodies curved in a shell shape whose walls are symmetrical with respect to the bearing axis, and wherein two stop surfaces fixed to the housing are provided on two stop ribs aligned symmetrically to a perpendicular radial plane containing a bearing axis of the common bearing, which stop ribs are arranged at a distance from one another, and wherein the lower stop edge is arranged at a distance to a horizontal radial plane which contains the bearing axis, which distance is larger than the distance of a stop surface to the perpendicular radial plane.

25. Air inlet arrangement according to claim 24, wherein the two stop ribs are connected with one another by means of a transverse web to form a U-shaped profile.

26. Air inlet arrangement according to claim 25, wherein the U-shaped profile is molded as a circular-arc-shaped curved recess into the housing wall of the intake housing.

27. Air inlet arrangement according to claim 26, wherein the U-shaped profile is provided with at least one transverse reinforcement for the reinforcement along its circular-arc-shaped course.

28. Air inlet arrangement according to claim 24, wherein the ram air flap and the circulating-air flap are designed corresponding to the hollow shape of a quarter sphere.

* * * * *